United States Patent [19]

Cox et al.

[11] Patent Number: 4,648,657

[45] Date of Patent: Mar. 10, 1987

[54] SEAT ADJUSTER RESPONSIVE TO TILTING OF SEAT BACK

[75] Inventors: David C. Cox, Jackson, Mich.; Thomas O. Marx, Rockton, Ill.

[73] Assignee: Atwood Vacuum Machine Company, Rockford, Ill.

[21] Appl. No.: 751,600

[22] Filed: Jul. 2, 1985

[51] Int. Cl.⁴ .............................................. B60N 1/04
[52] U.S. Cl. ................................................. 297/341
[58] Field of Search ............... 297/341, 342, 340, 378, 297/379; 248/429, 430

[56] References Cited

U.S. PATENT DOCUMENTS

| | | | |
|---|---|---|---|
| 3,940,182 | 2/1976 | Tamura | 297/341 |
| 4,101,169 | 7/1978 | Muraishi et al. | 297/341 |
| 4,378,101 | 3/1983 | Kazaoka et al. | 248/429 |
| 4,440,442 | 4/1984 | Drouillard et al. | 297/341 |
| 4,449,752 | 5/1984 | Yasumatsu et al. | 297/341 |

FOREIGN PATENT DOCUMENTS

| | | | |
|---|---|---|---|
| 91427 | 7/1980 | Japan | 297/341 |
| 156835 | 9/1984 | Japan | 297/341 |

Primary Examiner—Kenneth J. Dorner
Assistant Examiner—Mark W. Binder
Attorney, Agent, or Firm—Leydig, Voit & Mayer, Ltd.

[57] ABSTRACT

A seat adjuster mounts a vehicle seat for back and forth adjustment between different functional positions and is adapted to lock the seat in each selected position. When the seat back is tilted forwardly, the seat adjuster releases the seat to enable the seat to move fully forwardly to an entry position. A mechanical memory is incorporated in the seat adjuster and, when the seat is shifted rearwardly following forward movement to its entry position, the mechanical memory automatically stops the seat in its last-established functional position.

8 Claims, 11 Drawing Figures

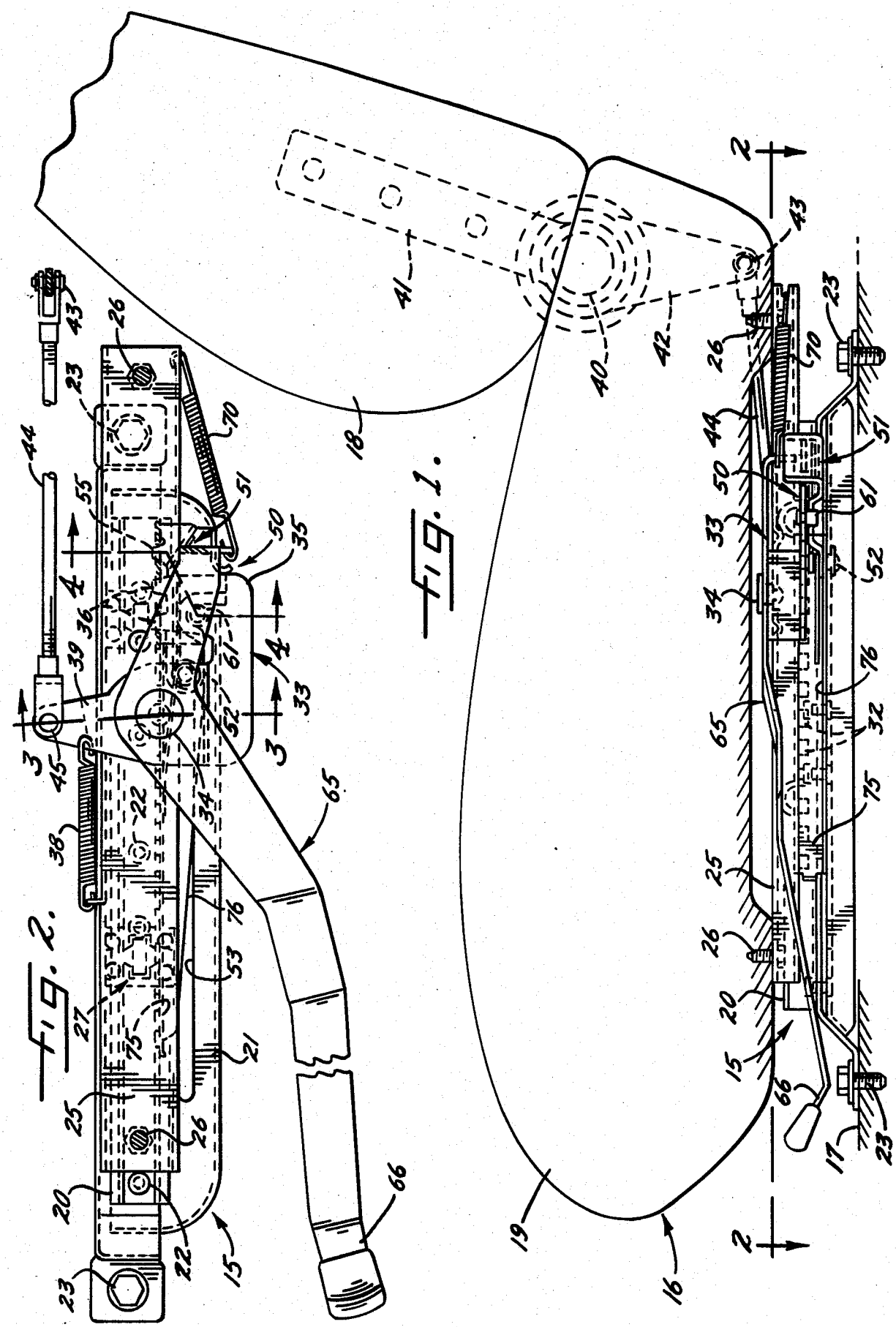

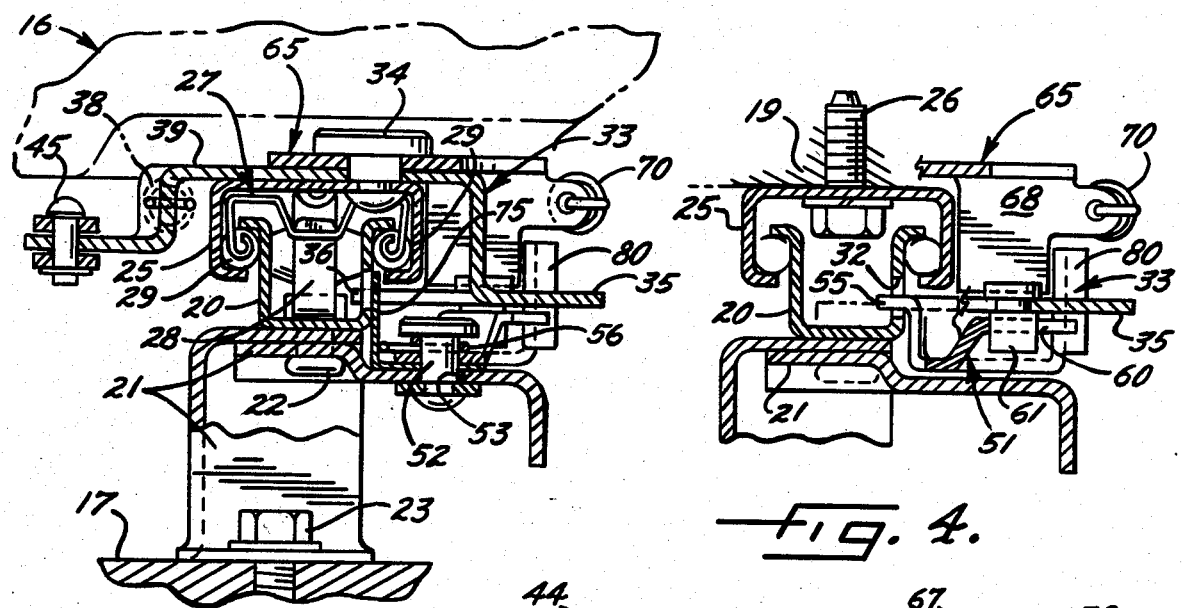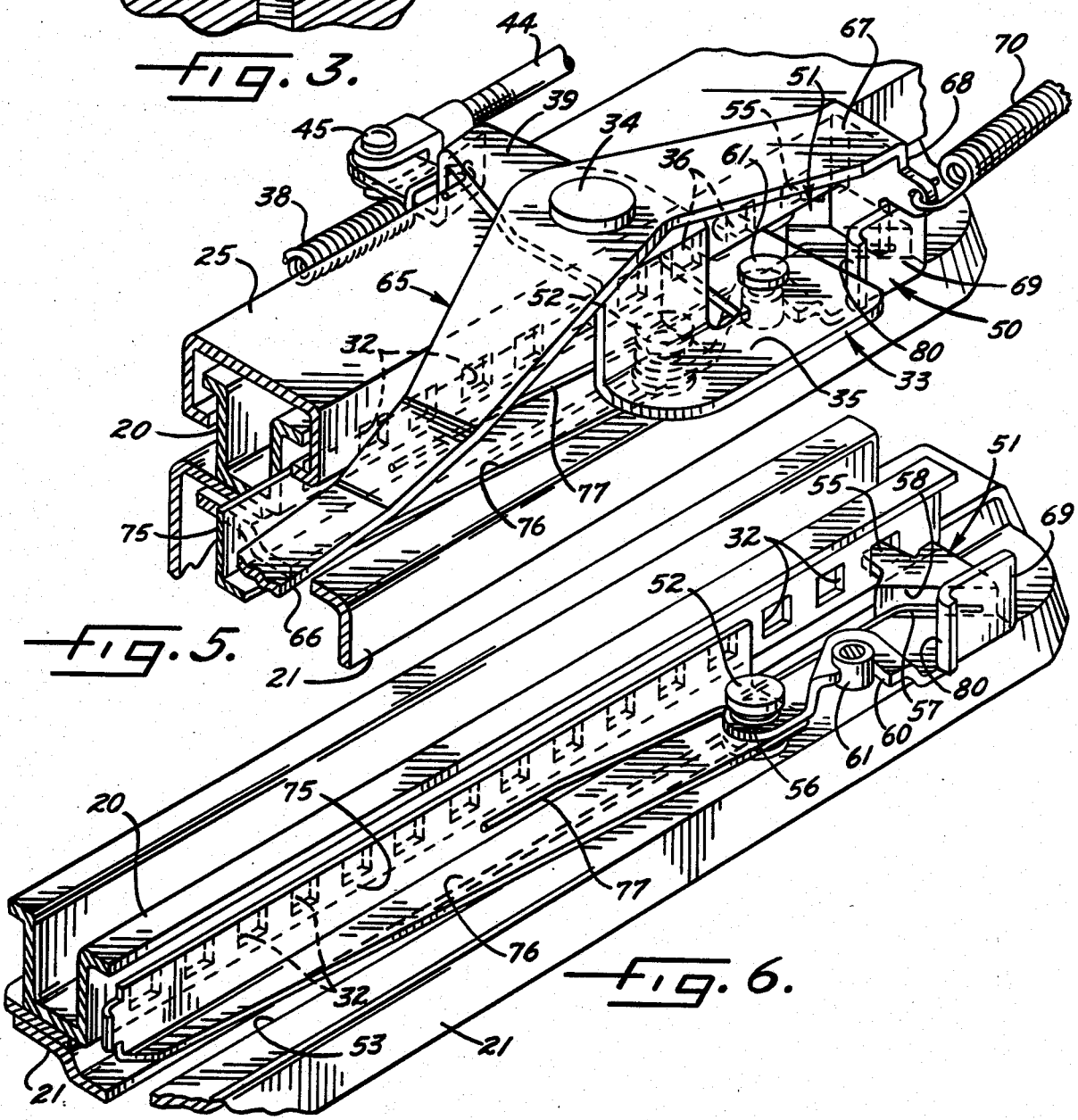

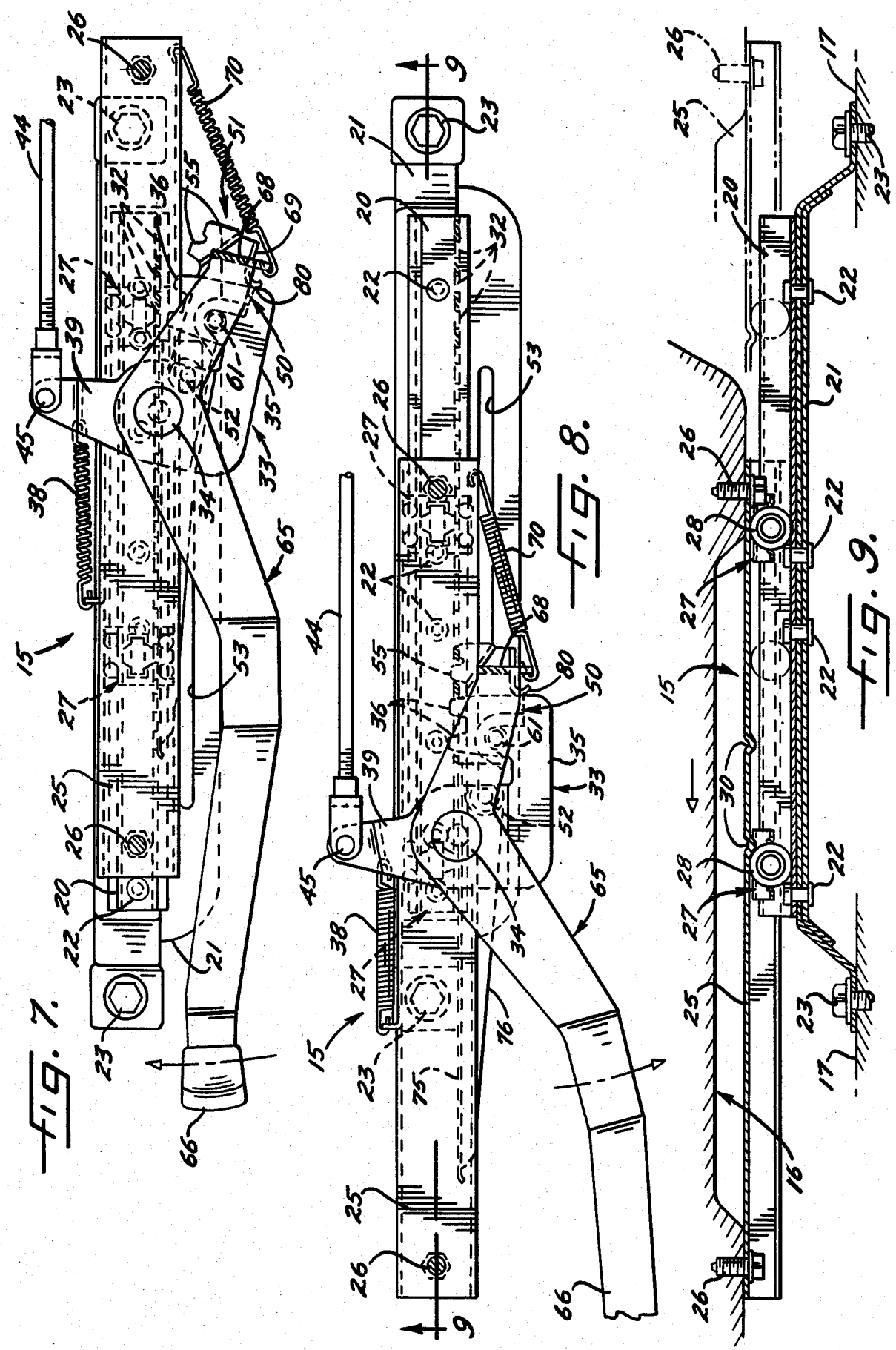

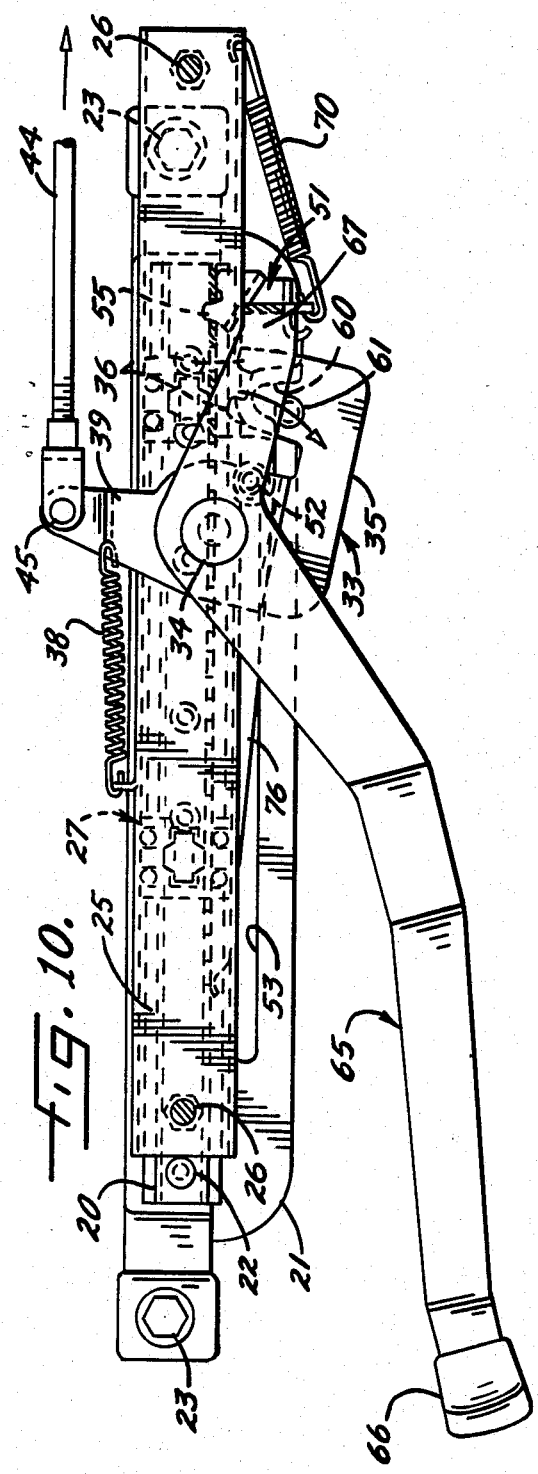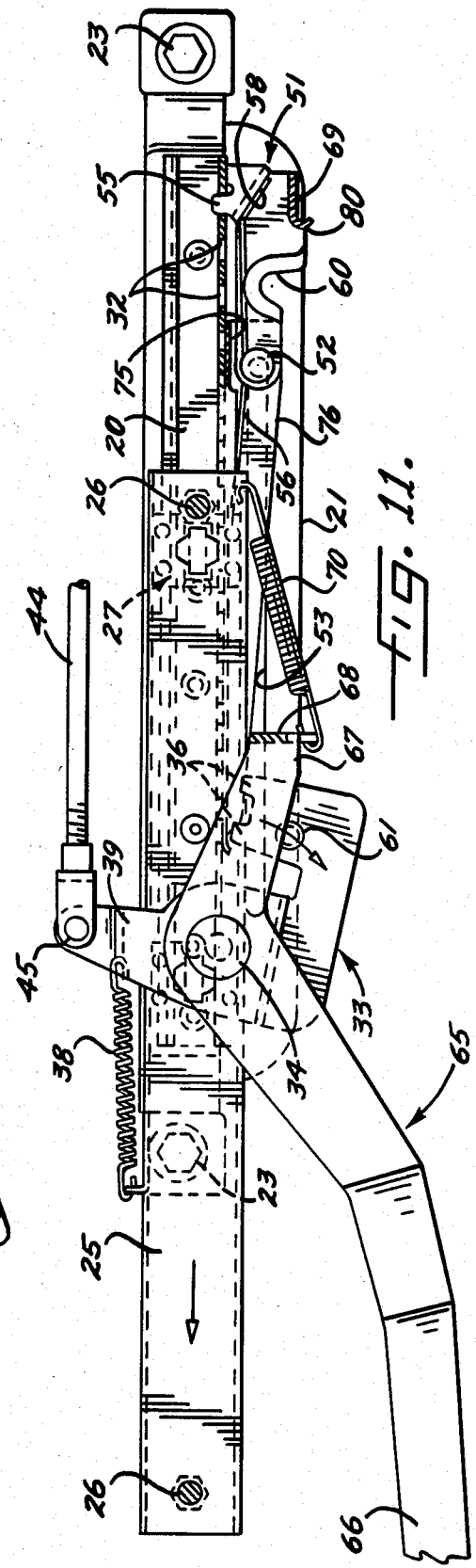

4,648,657

SEAT ADJUSTER RESPONSIVE TO TILTING OF SEAT BACK

TECHNICAL FIELD OF THE INVENTION

This invention relates to a seat adjusting mechanism and, more particularly to a seat adjusting mechanism for enabling a vehicle seat to be moved forwardly and rearwardly to a plurality of functional positions during normal use and from any one of these positions to a forward out-of-the-way entry position in response to forward tilting of the seat back.

BACKGROUND OF THE INVENTION

In two-door vehicles with only one passenger door per side for gaining access to both the front and back seats, the seat backs of the front seats typically pivot about the seat cushions so that the seat backs may be tilted forwardly to enable access to the back seats. In addition, in order to comfortably seat people of various sizes, the front seat is mounted on tracks which cooperate with an adjustment mechanism to enable the front seat to be moved forwardly and rearwardly. Typically, a handle which extends from beneath the front seat is activated by a seated passenger such that the seat is released from its fixed position and allowed to move on its tracks. When the passenger finds the most comfortable position for the seat, the handle is released and the seat is fixed at its new position on the tracks.

More recently, the adjustment mechanism for a front seat has been made responsive to forward tilting of the seat back so that such tilting releases the adjustment mechanism and allows the seat to move forwardly on the tracks to an entry position in order to provide more room for passengers entering the rear seats of the vehicle. This feature makes entry and exit to and from the back seat easier but, in many vehicles, it also requires the passenger in the front seat to re-adjust the front seat position each time the seat back is tilted by passengers entering or leaving the back seat.

Drouillard et al U.S. Pat. No. 4,440,442 discloses a seat adjusting mechanism in which the seat may, without trial and error adjustment, be re-set to its previous functional position when the seat is moved rearwardly after having been shifted forwardly to its entry position. The Drouillard et al adjusting mechanism, however, requires three sets of tracks, namely, a lower track fixed to the floor of the vehicle, an upper track fixed to the seat of the vehicle and an intermediate track slidably supported on the lower track and slidably supporting the upper track.

SUMMARY OF THE INVENTION

The general aim of the present invention is to provide a new and improved seat adjusting mechanism which eliminates the necessity for re-adjusting the front seat following each entry or exit of a back seat passenger and which, at the same time, eliminates the need for an intermediate track between the upper and lower tracks.

A more detailed object of the invention is to achieve the foregoing by providing a seat adjusting mechanism having a unique mechanical memory for causing the seat to automatically re-assume its most recently adjusted functional position when the seat is shifted rearwardly following forward shifting of the seat to its entry position.

Another object of the invention is to provide a mechanical memory seat adjusting mechanism having a novel position stop which is adjusted automatically whenever the seat is adjusted to a different functional position but which remains in a fixed position when the seat is shifted forwardly to its entry position. When the seat is subsequently returned rearwardly, the stop causes the seat to automatically re-assume its previously adjusted functional position.

Still another object of the invention is to provide a seat adjusting mechanism having a unique mask which selectively disables certain latching elements of the adjusting mechanism to enable the seat to automatically re-assume a previously adjusted functional position after the seat is shifted forwardly to its entry position.

These and other objects and advantages of the invention will become more apparent from the following detailed description when taken in conjunction with the accompanying drawings.

BRIEF DESCRIPTION OF THE DRAWINGS

FIG. 1 is a side elevational view of a seat mounted on the floor of a vehicle by a new and improved seat adjusting mechanism incorporating the unique features of the present invention.

FIG. 2 is a top plan view of the seat adjusting mechanism as taken substantially along the line 2—2 of FIG. 1 and shows the seat adjusted to its rearmost functional position.

FIGS. 3 and 4 are enlarged fragmentary cross-sections taken substantially along the lines 3—3 and 4—4, respectively, of FIG. 2.

FIGS. 5 and 6 are fragmentary perspective views of certain parts of the seat adjusting mechanism.

FIG. 7 is a top plan view similar to FIG. 2 but shows the seat adjuster set to enable normal adjustment of the seat to a different functional position.

FIG. 8 is a view similar to FIG. 7 but shows the seat shifted forwardly to its forwardmost functional position.

FIG. 9 is a fragmentary cross-section taken substantially along the line 9—9 of FIG. 8.

FIG. 10 is also a view similar to FIG. 7 but shows the seat adjuster set to enable adjustment of the seat to its entry position.

FIG. 11 is a view similar to FIG. 10 but shows the seat shifted forwardly to its entry position.

DETAILED DESCRIPTION OF THE PREFERRED EMBODIMENT

As shown in the drawings for purposes of illustration, the invention is embodied in a seat adjusting mechanism 15 for mounting a front vehicle seat 16 for back and forth adjustment on the floor pan 17 of the vehicle. In the present instance, the seat is of the type which is used with a two door automobile and includes a seat back 18 adapted to be tilted downwardly and forwardly relative to the seat cushion 19 to facilitate entry and exit of rear seat passengers.

In many respects, the seat adjusting mechanism 15 is of conventional commercially available construction and includes a fixed supporting structure defined by a fixed lower track 20 anchored to an underlying mounting member or plate 21 by longitudinally spaced rivets 22 (FIG. 9). The mounting plate 21 is elongated in the fore-and-aft direction and is secured rigidly to the floor pan 17 by screws 23.

The fixed track 21 is of U-shaped cross-section and slidably supports an upper track 25 which is of inverted U-shaped cross-section and which is attached rigidly to the underside of the seat cushion 19 by screws 26. Located between the two tracks are two longitudinally spaced cages 27 (FIGS. 3 and 9) each supporting a roller 28 and a set of anti-friction balls 29 to enable the upper track to slide freely on the lower track. The rollers coact with the rivets 22 and with dimples 30 (FIG. 9) in the upper track to limit the extreme forward and rearward positions of the upper track relative to the lower track.

To enable the seat 16 to be locked in various fore-and-aft positions, a longitudinally extending row of longitudinally spaced latch openings or windows 32 (FIG. 6) is formed in the outboard side of the fixed track 20. A latching member in the form of a lever 33 (FIG. 5) is pivotally mounted on the upper side of the movable track 25 by a rivet 34 and includes a latch arm 35 with a pair of longitudinally spaced latching lugs 36 adapted to project into adjacent windows 32 to lock the seat 16 and the movable track 25 in a fixed position relative to the fixed track 20. A contractile spring 38 is stretched between the movable track 25 and an inwardly extending arm 39 of the latching lever 33 and urges the lever counterclockwise about the rivet 34 to hold the lugs 36 in latching relation with the windows 35. When the latching lever is pivoted clockwise, the lugs are withdrawn from the windows to enable the upper track 25 to be adjusted forwardly or rearwardly along the lower track 20. Another spring (not shown) usually urges the seat and the upper track forwardly when the latching lever is tripped.

In FIG. 2, the movable upper track 25 is shown adjusted to its rearmost position and the latching lever 33 is shown as being engaged to lock the seat 16 in its rearmost functional position. When a passenger in the seat 16 manually releases the latching lever, the seat may be adjusted forwardly to a different functional position best suited to the comfort of the passenger. In addition, the latching lever 33 is released automatically when the seat back 18 is tilted downwardly and forwardly by a passenger entering or leaving the rear seat. As a result of automatic release of the latching lever, the seat may move fully forwardly to an entry position (FIG. 8) establishing maximum clearance between the front and rear seats. When the latching lever is released by tilting the seat back 18 forwardly, the seat may either be manually pushed forwardly to its entry position or, in more typical installations, may automatically shift forwardly through a spring action.

To release the latching lever 33 in response to forward tilting of the seat back 18, the latter is shown as being joined to the seat cushion 19 by a pivot mechanism 40 (FIG. 1) having an upwardly extending arm 41 and a downwardly extending arm 42. The upwardly extending arm is connected to the seat back 18 while the downwardly extending arm is pivotally connected at 43 to one end of a control member 44 (e.g., a rod or cable) whose other end is pivotally connected at 45 (FIG. 2) to the inwardly extending arm 39 of the latching lever 33. When the seat back 18 is tilted forwardly, the downwardly extending arm 42 is swung counterclockwise and pulls the control rod 44 to pivot the latching lever 33 clockwise about the rivet 34 and thereby pull the lugs 36 out of the windows 32. Reference may be made to the aforementioned Drouillard et al patent for a more detailed disclosure of a pivot mechanism somewhat similar to the pivot mechanism 40 and operable to permit a seat to move forwardly to an entry position in response to forward tilting of the seat back.

In accordance with the present invention, the seat adjuster 15 is provided with a novel mechanical memory mechanism 50 which uniquely coacts with the two conventional tracks 20 and 25 to "remember" each selected functional position of the seat 16. When the seat is returned rearwardly after having been shifted forwardly to its entry position by tilting of the seat back 18, the memory mechanism 50 stops the seat exactly in its most recent previously selected functional position. In this way, the front seat passenger need not use trial-and-error to re-seek the previously established functional position after each forward shift of the seat to its entry position.

More specifically, the memory mechanism 50 includes a blocking member 51 (FIG. 6) which herein is in the form of a lever having a forward end portion supported to pivot about a vertically extending rivet 52 which is guided to slide forwardly and rearwardly in an elongated and fore-and-aft extending slot 53 formed in the mounting plate 21 outboard of the tracks 20 and 25. The other end portion of the blocking lever 51 is formed with an inwardly projecting latching lug 55 adapted to project into a selected one of the windows 36 in the fixed track 20. A torsion spring 56 encircles the rivet 52 and includes an arm 57 which acts against a shoulder 58 on the blocking lever 51 to urge the lever counterclockwise about the rivet and to hold the lug 55 releasably in the selected window 36.

When the blocking lever 51 is swung clockwise about the rivet 52 to withdraw the lug 55 from its window 32, the blocking lever acts to pivot the latching lever 33 clockwise about the rivet 34 to retract the latching lugs 36 from their windows 32. For this purpose, a U-shaped notch 60 (FIGS. 6 and 11) is formed in the outboard edge of the blocking lever 51 and normally receives a pin 61 which depends from the latch arm 35 of the latching lever 33. When the blocking lever 51 is swung clockwise, the bottom of the notch 60 bears against the pin 61 to swing the latching lever 33 clockwise and thereby release the lugs 36.

To effect clockwise swinging of the blocking lever 51, the seat adjuster 15 includes a manually operable member or lever 65 which is adapted to be actuated by the front seat passenger to adjust the selected functional position of the seat 16. Herein, the adjusting lever 65 is supported to pivot about the rivet 34 and is formed with an elongated and generally forwardly extending handle 66 located near the front of the seat cushion 19. The adjusting lever 65 also includes a generally rearwardly extending arm 67 (FIG. 5) whose rear end is formed with a depending flange 68 having an outboard edge which engages the inboard side of a flange 69 projecting upwardly from the blocking lever 51. When the adjusting lever 65 is swung clockwise about the rivet 34 by manually grasping and swinging the handle 66, the flange 68 bears against the flange 69 and swings the blocking lever 51 clockwise about the rivet 52. A contractile spring 70 is stretched between the flange 68 and the rear end portion of the movable track 25 and urges the adjusting lever 65 counterclockwise about the rivet and to a normal, unoperated position.

The memory mechanism 50 is completed by a so-called mask 75 (FIG. 6) which serves to cover all of the windows 32 located forwardly of the particular windows which receive the lugs 36 of the latching lever 33. In the present instance, the mask 75 is defined by the upright flange of an elongated and generally L-shaped metal strip having a horizontal flange 76 which lies against the mounting plate 21, the rear end portion of the horizontal flange 76 being connected to the rivet 52. The torsion spring 56 includes a second leg 77 (FIG. 6) which bears against the upright flange or mask 75 to urge the neck into face-to-face engagement with the outboard side of the fixed track 20. The upper end portion of the mask is located between the tracks 20 and 25 as shown in FIG. 5.

The operation of the seat adjuster 15 will be explained by assuming that the seat 16 is locked in its rearmost functional position as shown in FIG. 2. When the seat is so positioned, the latching lug 55 of the blocking lever 51 extends into the rearmost window 32 of the fixed track 20 and is urged into latching engagement with the window by the leg 57 of the torsion spring 56. The two latching lugs 36 of the latching lever 33 extend into the next two windows 32 and are held in latching relation with such windows by virtue of the spring 38 urging the latching lever counterclockwise about the rivet 34. All windows located forwardly of the three rearmost windows are covered by virtue of the mask 75 being held against the side of the fixed track 20 by the leg 77 of the torsion spring 56.

To enable the seat 16 to be adjusted forwardly to a different selected functional position from the position shown in FIG. 2, the operating handle 66 is swung inwardly to pivot the adjusting lever 65 clockwise as shown in FIG. 7. During such pivoting, the flange 68 of the adjusting lever 65 bears against the flange 69 of the blocking lever 51 to swing that lever clockwise about the rivet 52. As a result, the latching lug 55 of the blocking lever is retracted from the rearmost window 32 and, at the same time, the bottom of the U-shaped notch 60 in the blocking lever acts against the pin 61 on the latching lever 33 to swing the latching lever clockwise and retract its lugs 36 from their windows (see FIG. 7). As a result of retraction of the lugs 36 and 55, the upper track 25 is free to shift forwardly relative to the lower track 20.

During such forward shifting, the latching lever 33 and the adjusting lever 65 move forwardly in unison with the upper track 25 by virtue of such levers being connected to the upper track by the rivet 34. The blocking lever 51 and the mask 75 also move forwardly in unison with the upper track by virtue of the pin 61 of the latching lever 33 bearing against the forward side of the U-shaped notch 60 in the blocking lever. The rivet 52 slides forwardly in the slot 53 in the mounting plate 21 to permit forward shifting of the blocking lever 51 and the mask 75.

When the upper track 25 reaches the forwardly adjusted functional position shown in FIG. 8, the handle 66 is released and the adjusting lever 65 is returned to its normal position by the spring 70. In addition, the springs 38 and 56 swing the latching lever 33 and the blocking lever 51 counterclockwise to cause the lugs 36 and 55 to project into the forward windows 32 and lock the seat 16 in its newly adjusted functional position.

Adjustment of the seat 16 to its fully forward entry position is initiated by tilting the seat back 18 forwardly. Again assuming that the seat is in its rearmost position as shown in FIG. 10, such tilting pulls the control rod 44 rearwardly and causes the latching lever 33 to pivot clockwise about the rivet 34 to retract the lugs 36 from the windows 32 and free the seat 16 for forward movement. Pivoting of the latching lever 33 by the control rod 44, however, does not effect movement of either the blocking lever 51 or the adjusting lever 65. Instead, the pin 61 on the latching lever 33 simply swings out of the U-shaped notch 60 in the blocking lever 51 to leave the blocking lever positioned with its latching lug 55 in latching relation with the alined window 32.

Once the latching lever 33 has been pivoted clockwise by the control rod 44, the upper track 25 may shift fully forwardly to the entry position shown in FIG. 11. During such shifting, the latching lever 33 and the adjusting lever 65 move forwardly in unison with the movable track 25 as before (see FIG. 11) but the blocking lever 51 and the mask 75 remain stationary since the pin 61 of the latching lever simply travels forwardly out of the notch 60 in the blocking lever. As a result, the blocking lever 51 remains in a rearwardly located position while the mask 75 continues to cover all of the windows 32 except the three rearmost windows.

When the seat back 18 is returned to an upright position, the latching lever 33 is returned counterclockwise toward its latched position. As long as the seat 16, however, is in its forward entry position, the mask 75 prevents the lugs 36 of the latching lever 33 from entering the forward windows 32 and thus the upper track 25 remains free to slide rearwardly. Accordingly, a passenger entering the front of the vehicle need merely push the seat rearwardly to return the seat toward its most recently occupied functional position. As the track 25 moves rearwardly, the lugs 36 slide along the mask 75 and are prevented from entering any window 32 located forwardly of the second and third rearmost windows. As the lugs 36 move into alinement with those windows, the rear edge of the latching lever 33 engages and is stopped by a stop 80 (FIG. 6) formed by curving the forward end of the flange 69 on the blocking lever 51. At the same time the latching lever 33 engages the stop 80, the spring 38 pivots the latching lever counterclockwise to cause the lugs 36 to enter the two alined windows 32 and to lock the seat 16 in its previously established forward position.

It will be apparent that the fore-and-aft position of the stop 80 is changed in the same way that the position of the mask 75 is changed whenever the functional position of the seat 16 is adjusted following actuation of the adjusting lever 65 (compare FIGS. 7 and 8). Thus, upon return of the seat from its entry position, the mask 75 prevents the seat from being stopped forwardly of its most recently established functional position while engagement of the latching lever 33 with the stop 80 prevents the seat from traveling rearwardly past that functional position. Accordingly, the seat is automatically latched in its most recent functional position regardless of the specific fore-and-aft location of that position.

From the foregoing, it will be apparent that the present invention brings to the art a seat adjuster 15 with a new and improved mechanical memory mechanism 50 which enables the functional position of the seat 16 to be adjusted as desired and which enables the seat to be latched automatically in the most recently established functional position following return of the seat from its entry position. The blocking lever 51 and the mask 75 of the memory mechanism not only are of simple construction in themselves but also enable the memory mechanism to be incorporated in a relatively simple seat adjuster having two conventional fixed and movable tracks 20 and 25.

Those of ordinary skill will appreciate that the seat adjuster 15 could be incorporated in a vehicle in which forward movement of the seat 16 to its entry position is initiated by a manual operation other than forward tilting of the seat back 18. For example, a manually operable release lever (not shown) could be associated with the seat and could be actuated to cause the control rod 44 to effect clockwise pivoting of the latching lever 33.

I claim:

1. Mechanism for mounting a vehicle seat for fore-and-aft adjustment to different selected functional positions on a vehicle floor and for enabling the seat to move forwardly to an entry position in response to forward tilting of the seat back, said mechanism comprising an elongated support member mountable in a fixed position on the vehicle floor and formed with a fore-and-aft extending row of openings, an elongated track member attachable to the seat and mounted to slide back and forth on said support member, coacting means on said members and normally engaging one another to hold said seat in a selected functional position, manually operable means for releasing said coacting means to enable the functional position of said seat to be adjusted, means responsive to forward tilting of said seat back for releasing said coacting means to enable said seat to move forwardly to said entry position, a positive stop extending laterally outwardly of and normally held in a fixed fore-and-aft position on said support member, means extending laterally outwardly from said track member and engageable with said stop to limit rearward movement of said seat when the latter is returned rearwardly from said entry position, said stop forming part of a lever having a lug adapted to swing into and out of a selected one of said openings, means mounting said lever on said support member both to swing about an upright axis on said support member and to move back and forth along said support member and means for causing adjustment of the fore-and-aft position of said stop on said support member when the functional position of said seat is adjusted while leaving the stop in a fixed fore-and-aft position on said support member when said seat is shifted forwardly to said entry position.

2. Mechanism as defined in claim 1 in which said manually operable means include means for swinging said lever to move said lug out of said opening when said manually operable means is operated to release said coacting means.

3. Mechaniam as defined in claim 2 in which said coacting means include a latching member carried by said track member and mounted on said track to swing about an upright axis, said latching member being adapted to project into a selected one of said openings in said support member, and a mask for covering openings located forwardly of such selected opening, said mask being connected to said lever to move back and forth with said lever along said support member.

4. Mechanism for mounting a vehicle seat for fore-and-aft adjustment to different selected functional positions on a vehicle floor and for enabling the seat to move forwardly to an entry position in response to forward tilting of the seat back, said mechanism comprising an elongated fixed track mountable in a stationary position on the vehicle floor, an elongated movable track attachable to the seat and slidable back and forth on the fixed track, a fore-and-aft extending row of latch openings formed in and spaced along said fixed track, a latch member carried by said movable track and normally projecting into a selected one of said latch openings to hold said seat in a selected functional position, said latch member having a portion extending laterally outwardly from said tracks, manually operable means for releasing said latch member from the selected latch opening to enable the functional position of said seat to be adjusted, means responsive to forward tilting of said seat back for releasing said latch member from the selected latch opening to enable said seat to move forwardly to said entry position, a mask for covering latch openings located forwardly of the selected opening, a positive stop connected to said mask and extending laterally outwardly from said tracks and said mask, said stop being engageable with said laterally outwardly extending portion of said latch member to stop rearward movement of said movable track when said seat is returned rearwardly from said entry position, said stop and said mask normally being held in a fixed fore-and-aft position by one of said latch openings, means for releasing said stop from such latch opening and for causing said stop and said mask to move forwardly and rearwardly with said movable track and along the latch openings in said fixed track when the functional position of said seat is adjusted after release of said latch member by said manually operable means, and means for keeping said stop held by such latch opening and for holding said stop and said mask in said fixed fore-and-aft position when said seat is shifted forwardly to said entry position after release of said latch member by said responsive means and as a result of forward tilting of said seat back.

5. Mechanism as defined in claim 4 in which said stop forms part of a blocking member having a latching lug spaced laterally inwardly from said stop and normally projecting into one of said latch openings, said blocking member being mounted on said fixed track to enable said latching lug to move into and out of said one latch opening and alos being mounted to move forwardly and rearwardly along said fixed track to enable said latching lug to move into alinement with different ones of said latch openings, said manually operable means comprising a lever engageable with said blocking member to move said latching lug out of its latch opening when said manually operable means is operated to release said latch member, and said latch member having means for moving said blocking member along said fixed track when said seat is adjusted after release of said latch member by said manually operable means.

6. Mechanism for mounting a vehicle seat for fore-and-aft adjustment to different selected functional positions on a vehicle floor as a result of one manual operation and for enabling the seat to move forwardly to an entry position as a result of a different manual operation, said mechanism comprising an elongated support member mountable in a fixed position on the vehicle floor and formed with a fore-and-aft extending row of openings, an elongated track member attachable to the seat and mounted to slide back and forth on said support member, coacting means on said members and normally engaging one another to hold said seat in a selected functional position, means operable by said one manual operation for releasing said coacting means to enable the functional position of said seat to be adjusted, means responsive to said different manual operation for releasing said coacting means to enable said seat to move forwardly to said entry position, a positive stop extending laterally outwardly of and normally held in a fixed fore-and-aft position on said support member, means extending laterally outwardly from said track member and engageable with said stop to limit rearward movement of said seat when the latter is returned rearwardly from said entry position, said stop forming part of a lever having a lug adapted to swing into and out of a selected one of said openings, means mounting said lever on said support member both to swing about an upright axis on said support member and to move back and forth along said support member and means for causing adjustment of the fore-and-aft position of said stop on said support member when the functional position of said seat is adjusted while leaving the stop in a fixed fore-and-aft position on said support member when said seat is shifted forwardly to said entry position.

7. Mechanism for mounting a vehicle seat for fore-and-aft adjustment to different selected functional positions on a vehicle floor as a result of one manual operation and for enabling the seat to move forwardly to an entry position as a result of a different manual operation, said mechanism comprising an elongated fixed track mountable in a stationary position on the vehicle floor, an elongated movable track attachable to the seat and slidable back and forth on the fixed track, a fore-and-aft extending row of latch openings formed in and spaced along said fixed track, a latch member carried by said movable track and normally projecting into a selected one of said latch openings to hold said seat in a selected functional position, said latch member having a portion extending laterally outwardly from said tracks, manually operable means operable by said one manual operation for releasing said latch member from the selected latch opening to enable the functional position of said seat to be adjusted, means responsive to said different manual operation for releasing said latch member from the selected latch opening to enable said seat to move forwardly to said entry position, a mask for covering latch openings located forwardly of the selected opening, a positive stop connected to said mask and extending laterally outwardly of said tracks and said mask, said stop being engageable with said laterally extending portion of said latch member to stop rearward movement of said movable track when said seat is returned rearwardly from said entry position, said stop and said mask normally being held in a fixed fore-and-aft position by one of said latch openings, means for releasing said stop from such latch opening and for causing said stop and said mask to move forwardly and rearwardly with said movable track and along the latch openings in said fixed track when the functional position of said seat is adjusted after release of said latch member by said manually operable means as a result of said one manual operation, and means for keeping said stop held by such latch opening and for holding said stop and said mask in said fixed fore-and-aft position when said seat is shifted forwardly to said entry position after release of said latch member by said responsive means and as a result of said different manual operation.

8. Mechanism for mounting a vehicle seat for fore-and-aft adjustment to different selected functional positions on a vehicle floor as a result of one manual operation and for enabling the seat to move forwardly to an entry position as a result of a different manual operation, said mechanism comprising an elongated fixed track mountable in a stationary position on the vehicle floor, an elongated movable track attachable to the seat and slidable back and forth on the fixed track, a fore-and-aft extending row of latch openings formed in and spaced along said fixed track, a latch member supported by said movable track to swing about an upright axis and normally projecting into a selected one of said latch openings to hold said seat in a selected functional position, said latch member having a portion extending laterally outwardly from said tracks, manually operable means swingable about said upright axis and operable by said one manual operation for swinging said latch member about said upright axis and releasing said latch member from the selected latch opening to enable the functional position of said seat to be adjusted, means responsive to said different manual operation for swinging said latch member about said upright axis and releasing said latch member from the selected latch opening to enable said seat to move forwardly to said entry position, a mask for covering latch openings located forwardly of the selected opening, a positive stop connected to said mask and extending laterally outwardly of said tracks and said mask, said stop being engageable with said laterally extending portion of said latch member to stop rearward movement of said movable track when said seat is returned rearwardly from said entry position, said stop and said mask normally being held in a fixed fore-and-aft position by one of said latch openings, means for swinging said stop about an upright axis to release said stop from such latch opening and to cause said stop and said mask to move forwardly and rearwardly with said movable track and along the latch openings in said fixed track when the functional position of said seat is adjusted after release of said latch member by said manually operable means as a result of said one manual operation, and means for keeping said stop held by such latch opening and for holding said stop and said mask in said fixed fore-and-aft position when said seat is shifted forwardly to said entry position after release of said latch member by said responsive means and as a result of said different manual operation.

* * * * *